(12) United States Patent
Sazbo et al.

(10) Patent No.: US 7,121,592 B2
(45) Date of Patent: Oct. 17, 2006

(54) FLUID QUICK CONNECT WITH ADJUSTABLE FLOW CONTROL VALVE

(75) Inventors: George Sazbo, Ortonville, MI (US); Gary Klinger, Rochester Hills, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/937,924

(22) Filed: Sep. 10, 2004

(65) Prior Publication Data

US 2006/0055172 A1 Mar. 16, 2006

(51) Int. Cl.
*F16L 37/00* (2006.01)
(52) U.S. Cl. ............. 285/305; 137/614.02; 137/614.05
(58) Field of Classification Search ................ 285/305, 285/319; 137/614.02, 614.05, 614.06
See application file for complete search history.

(56) References Cited

U.S. PATENT DOCUMENTS 3,132,667 A * 5/1964 Baker et al. ................ 285/319
3,777,771 A 12/1973 De Visscher
4,825,893 A * 5/1989 Gailey ........................ 285/316
5,277,402 A 1/1994 Szabo
5,478,046 A 12/1995 Szabo
5,738,144 A 4/1998 Rogers
6,095,190 A 8/2000 Wilcox et al.
6,371,529 B1 4/2002 Szabo et al.
6,612,622 B1 9/2003 Andre et al.

* cited by examiner

*Primary Examiner*—David Bochna
(74) *Attorney, Agent, or Firm*—Young & Basile, P.C.

(57) ABSTRACT

A fluid quick connector includes first and second coupled housings having aligned bores. A biased shut off valve is mounted in the first housing and has a seal end normally biased into a fluid flow blocking position; but movable away from the seal upon contact with an end form inserted into the bores to a fluid flow enabling position. The first and second housings interact at an adjustable axial interface formed of mating threads to vary the insertion distance of the endform into the first housing after the endform is latched in the first and second housings by a retainer carried in the second housing, to regulate the fluid flow through the quick connector.

7 Claims, 6 Drawing Sheets

FLUID QUICK CONNECT WITH ADJUSTABLE FLOW CONTROL VALVE

BACKGROUND

The present invention relates, in general, to fluid quick connectors which couple fluid connector components and, more particularly, to fluid quick connectors with means operative to check the flow of fluid therethrough under certain operating conditions.

Snap-fit or quick connectors are employed in a wide range of applications, particularly, for joining fluid carrying conduits in automotive and industrial application. Such quick connectors utilize retainers or locking elements for securing one connector component, such as a tubular conduit, within a complimentary bore of another connector component or housing. Such retainers are typically of either the axially-displaceable or radially-displaceable type. The terms "axially-displaceable" or "radially-displaceable" are taken relative to the axial bore through another component.

In a typical quick connector with an axially displaceable, retainer, the retainer is mounted within a bore in a housing of one connector component of housing. The retainer has a plurality of radially and angularly extending legs which extend inwardly toward the axial center line of the bore in the housing. A tube or conduit to be sealingly mounted in the bore in the housing includes a radially upset portion or flange which abuts an inner peripheral surface of the retainer legs. Seal and spacer members as well as a bearing or top hat are typically mounted in the bore ahead of the retainer to form a seal between the housing and the tube when the tube is lockingly engaged with the retainer legs in the housing.

Radially displaceable retainers are also known in which the retainer is radially displaceable through aligned bores or apertures formed transversely to the main throughbore in the housing. The radially displaceable retainer is typically provided with a pair of depending legs which are sized and positioned to slip behind the radially upset portion or flange on the tube only when the tube or conduit is fully seated in the bore in the housing. This ensures a positive locking engagement of the tube with the housing as well as providing an indication that the tube is fully seated since the radially displaceable retainer can be fully inserted into the housing only when the tube has been fully inserted into the bore in the housing.

Regardless of the type of retainer, the housing portion of a fluid connector typically includes an elongated stem having one or more annular barbs spaced from a first end. The barbs provide secure engagement with a tube or conduit which is forced over the barbs to connect the housing with one end of the conduit.

It is desirable in fluid handling conduits and fluid quick connectors to ensure that the connectors have their mating portions properly coupled together. A faulty connector enables an associated host system to leak fluid. This can be particularly disadvantageous when the system is under pressure.

In fluid quick connectors, it is important that the two mating portions of the connector are properly coupled when one portion is inserted into the other portion to establish the fluid connection therebetween while seal elements fluidically seal the coupled portions together.

It is known to provide a one-way, shut-off valve in the connector housing which is normally biased to a fluid blocking position until the tubular component is fully inserted into and coupled to the housing. Only at this fully inserted, sealed position does the tubular component move the valve to an open or flow enabling position to enable fluid to flow through the connector.

However, such previously known quick connect fluid couplings with shut-off valves have all switched fluid flow between full off and full on, with the quantity of fluid flow through the quick connector being determined solely by the diameter of the connector portions.

In many fluid handling applications, it would be desirable to have a quick connector with a one way shut-off valve which ensures that the connector components are fully coupled and sealed before flow is enabled; while at the same time providing adjustability in the quantity of fluid flow after the check valve has been moved to a flow enabling position.

SUMMARY

The present invention is a fluid quick connector for joining first and second fluid elements, such as conduits, hoses, etc.

In one aspect, the fluid quick connector includes a first housing having a throughbore and a second housing having a throughbore. The second housing is coupled to the first housing with the throughbores in fluid flow communication with an end form having a bore extending from a tip end.

A shut off valve is disposed in the bore in the first housing, the valve having a seal end and a shoulder. The valve is axially movable from a fluid flow blocking position to an open, fluid flow position in response to insertion from the end form in the bores in the first and second housings into contact with the shoulder of the valve.

A retainer is carried on the second housing for releasably locking the end form in the second housing.

Means are provided for varying the position of the valve in the first housing after the endform is latched in the fully inserted position in the first housing to provide fluid flow regulation. In one aspect, the position varying means includes means for selectively varying the position of the valve between the fluid flow blocking position and the fluid flow open, position to selectively regulate fluid flow through the first and second housings and the end form.

In one aspect, the means for selectively varying the position of the valve includes threads formed on adjoining portions of the first and second housings whereby threading of the first and second housings relative to each other varies the position of the valve by axially translating the end form relative to the first housing causing movement of the valve between the two positions.

The fluid quick connector of the present invention uniquely provides a fluid quick connector for fluidically coupling fluid elements which has an automatic break capability provided by an internally biased shut off valve which moves to an open fluid flow position only when an end form is fully inserted into a housing of the quick connector. The inventive fluid quick connect provides this capability along with flow regulation by allowing the position of the fully latched and sealed end form to be selectively varied relative to the first housing thereby varying the position of the valve between the fully opened fluid flow position and the fully closed, fluid blocking position so as to regulate the fluid flow through the housings and the end form.

BRIEF DESCRIPTION OF THE DRAWING

The various features, advantages and other uses of the present invention will become more apparent by referring to the following detailed description and drawing in which.

DETAILED DESCRIPTION

Figure 1:
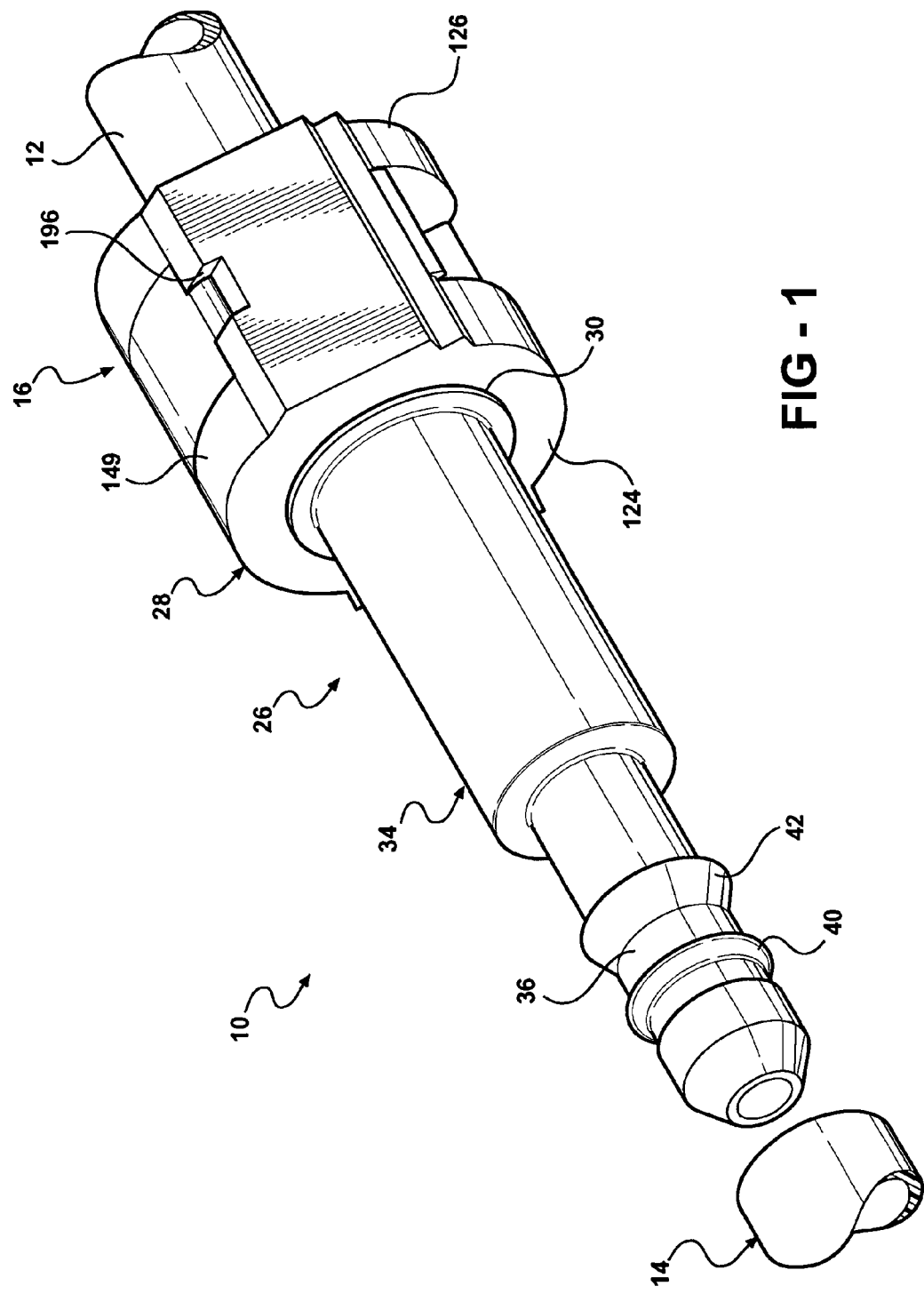
FIG. 1 is a perspective view of an assembled quick connector according to the present invention.

Referring now to FIGS. 1–6, there is depicted one aspect of a quick connector 10 constructed in accordance with the teachings of the present invention. As is conventional, the quick connector 10 is adapted for sealingly and lockingly, yet removably interconnecting first and second conduits 12 and 14 in a fluid tight, leak proof, sealed connection by a snap-together connection.

The first conduit 12 is formed of metal or plastic and has an endform with a tapered end or tip 18 at one end, a through bore 20, and an enlarged annular flange 22 spaced from the tip end 18.

Further, the following description of the use of the fluid quick connector 10 to connect tubular members will be understood to apply to the connection of conduits, hoses, and/or solid metal or plastic tubes to each other in fluid flow communication. The end of a conduit or tubular member inserted into the interior of one end of the quick connector 10 is defined herein as an endform. The endform can be a separate member which receives a separate hose or conduit at one end or a shape integrally formed on the end of an elongated metal or plastic tube. Further, the endform can be integrally formed on or mounted as a separate element to a fluid use device, such as a pump, filter, etc., rather than as part of an elongated conduit.

The second conduit 14 is typically formed of a flexible material, such as a polymer, i.e., nylon, in one or more layers. The conduit 14 has an internal bore which communicates with a bore extending through the quick connector 10, as described hereafter, and the bore 20 in the first conduit 12.

The quick connector 10 includes a first housing 26 and a second housing 28 which are adapted to be axially connected to provide an axially extending throughbore between opposite ends.

The first housing 26 is formed of a one piece body, typically metal or a high strength plastic, and has a stepped exterior surface formed of a raised annular flange 30 at one end, an enlarged diameter portion 32 extending from the flange 30, an intermediate, smaller diameter portion 34, and a necked-down portion or stem 36 which extends from the intermediate diameter portion 34 to an annular flange 38 formed at another end of the first housing 26. At least one and, preferably, a plurality of longitudinally spaced barbs or projections 40 and 42 are formed along the exterior of the stem 36 for secure engagement with the second conduit 14, which is slidably urged thereover.

An endform interface member 50 in the form of a cap having a conical end portion which smoothly merges with an annular end portion is slidably mounted over the end of the stem 36 of the first housing 26. A seal member 52, typically in the form of an O-ring is interposed between the annular end portion of the cap 50 and the barb 40.

The second housing 28 is preferably formed of a one piece, unitary body of a high strength plastic, such as nylon, for example. The second housing 28 has a first end 124 and an opposed second end 126. As shown by example in FIG. 2, the housing 28 has a generally cylindrical, linear form between the first and second ends 124 and 126.

Figure 2:
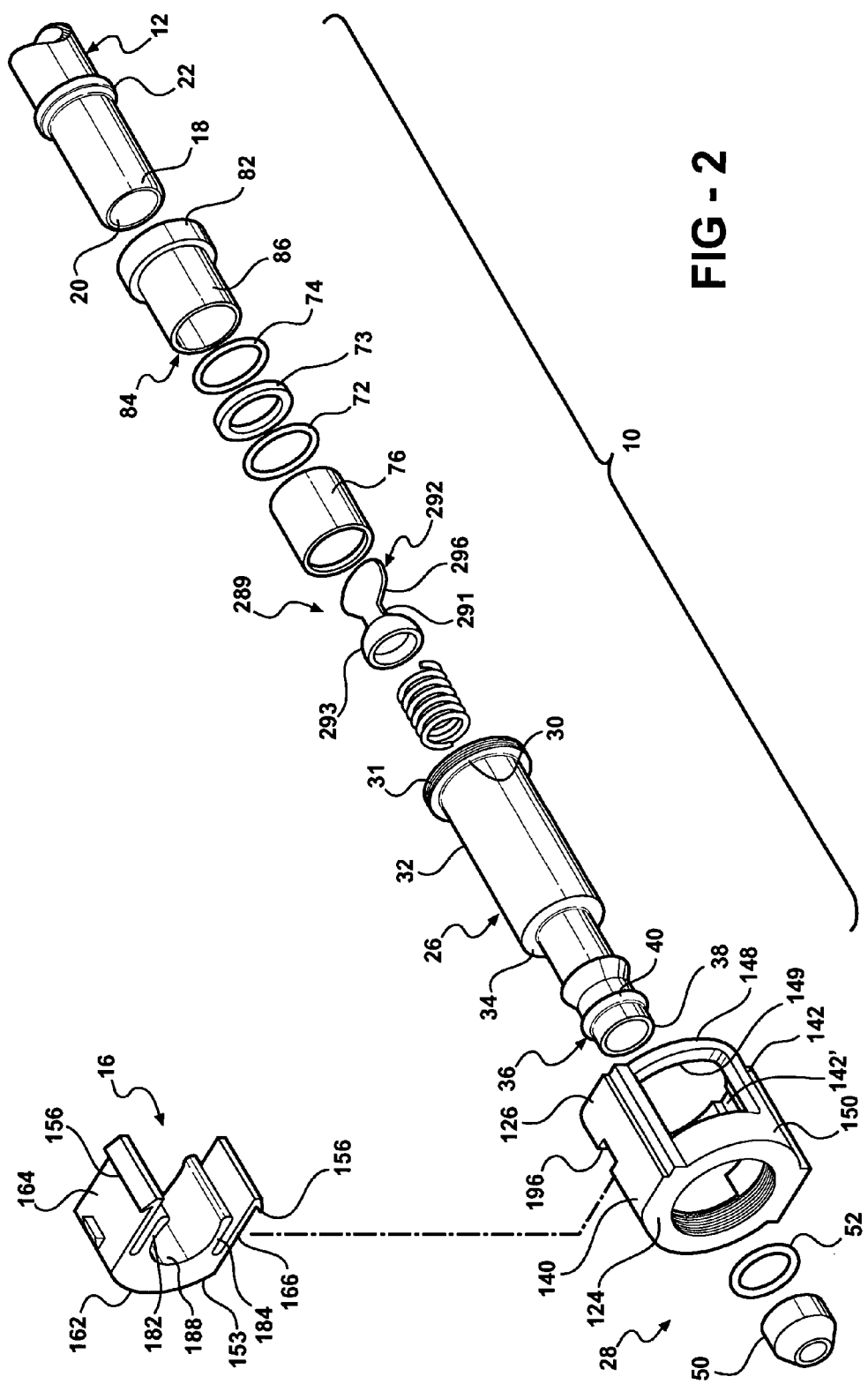
FIG. 2 is an exploded, perspective view of the quick connector shown in FIG. 1.
Figure 4:
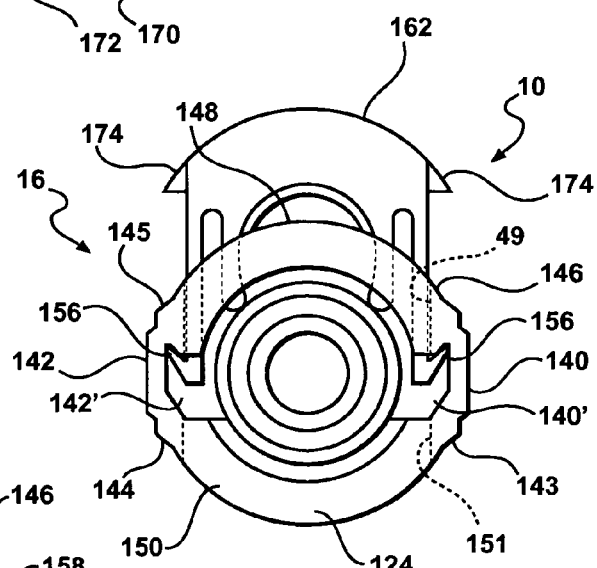
FIG. 4 is an end view of the retainer mounted in a prelatched, shipping position in the quick connector of FIG. 1.
Figure 5:
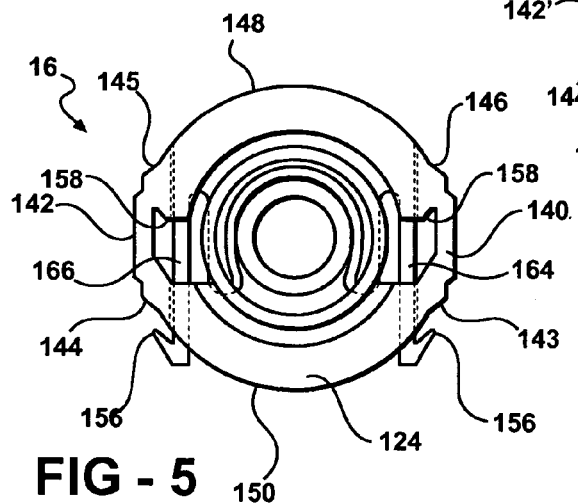
FIG. 5 is an end view of the retainer and the quick connector in a fully latched position.
Figure 6:
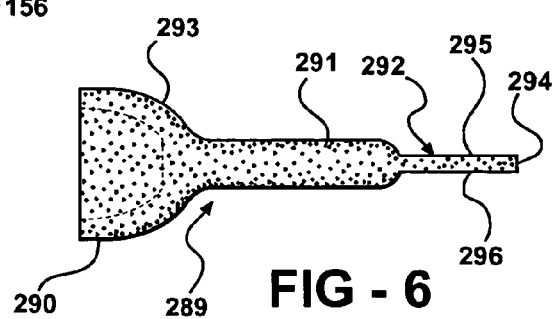
FIG. 6 is a side elevational view of the shut off valve shown in FIG. 2.

As shown in detail in FIGS. 2, 4 and 5, the first end 124 of the housing 28 is formed with a pair of opposed, exterior flat surfaces 140 and 142. The flat surfaces 140 and 142 are diametrically opposed on the first end 124 and may be centrally located on each diametrical side of the first end 124. The adjacent surfaces of the housing 28 to one side of the flat surfaces 140 and 142 form an opposed pair of lock surfaces or flats, such as a first flat 143 and a second flat 144. A second pair of flats 145 and 146 are formed on the housing 28 or the other side of the flat surfaces 140 and 142. The flats 143 and 144 extend axially a short distance from the first end 124 of the housing 28. Opposed surfaces 148 and 150 of the first end 124 of the housing 28 between the flats 143 and 144 and the flats 145 and 146 have a generally arcuate shape as shown in FIGS. 4 and 5. Apertures 149 and 151 are formed respectively in each surface 148 and 150. The apertures 149 and 151 are aligned to form a transverse bore extending through the first end 124 of the housing 28 which is disposed in communication with the throughbore in the housing 28.

The retainer 16 is formed of a one-piece body of a suitable plastic, such as a high strength plastic, for example, PPA, and has an end wall 162 formed of a generally curved or arcuate shape, by way of example only, and first and second spaced side legs 164 and 166. The side legs 164 and 166 extend generally parallel to each other from opposite ends of the end wall 162. Further, each side leg 164 and 166 has an outer end 172, although it is also possible to connect the side legs 164 and 166 at a lower portion by an arcuate member.

A pair of projections 170 extend along the length of the retainer 16 between opposed side edges of the side legs 164 and 166, respectively. The projections 170 are located adjacent the outer end 172 of each leg 164 and 166. The projections 170 engage surfaces on the housing 28 to position the retainer 16 in the shipping position shown in FIG. 4, or in the fully inserted, latched position shown in FIG. 5. Further, a pair of outward extending lock tabs or edges 174 are formed adjacent the end wall 162 on each side leg 164 and 166 and engage notches 196 in the second housing 28 in the fully latched position of the retainer 16.

Figure 3:
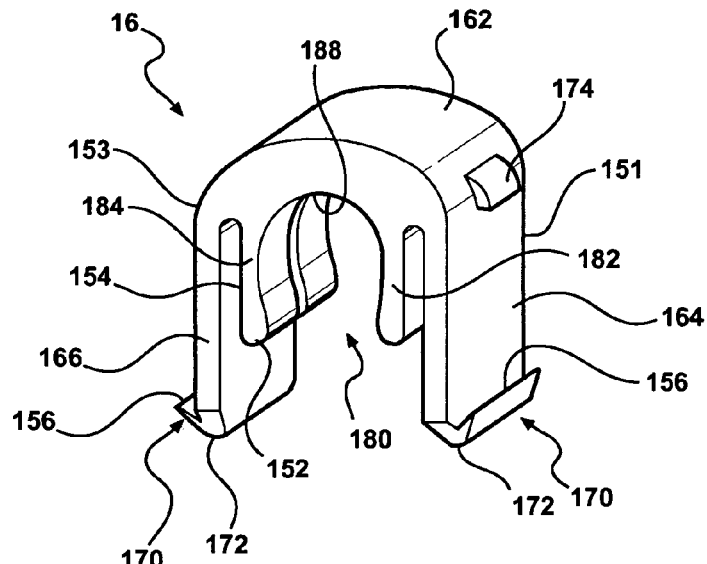
FIG. 3 is a perspective view of one aspect of a retainer used in the quick connector shown in FIGS. 1 and 2.

As shown in FIGS. 3–5, the projections 170 on the legs 164 and 166 of the retainer 16 are formed with an angled hook-like shape terminating in a tip 156. The tip 156 is disposed at an acute, upturned angle with respect to the corresponding legs 164 and 166.

Grooves 140' and 142' are formed in the interior of the flat surfaces 140 and 142, respectively, and include a recess or notch 158 at one end which is shaped complimentary to the shape of the tip 156 of the projection 170 on each of the legs 164 and 166 of the retainer 16. In this manner, pull out of the retainer 16 from the housing 28 is resisted by the interlocking tips 156 on the legs 164 and 166 of the retainer 16 which are seated within the notches 158 in the grooves 140' and 142' in the housing 28 as shown in the partially inserted, shipping position of the retainer 16 in FIG. 4. The flats or lock edges 144 and 146 are disposed at an angle complimentary to the acute angle of the tips 156 on the legs 164 and 166 of the retainer 16. This enables interlock of the tips 156 with the flats 144 and 146 resists pull out of the retainer 16 from the housing 28 from the fully latched position shown in FIG. 5.

The hook shaped tips 156 on the legs 164 and 166 of the retainer 16 in conjunction with the grooves 140' and 142' in the housing 28 also provide a distinct, "avalanche effect" snap action of the retainer 16 in the housing 28. The grooves 140' and 142' in the housing 28 are formed in generally planar flat surfaces. The inner surfaces force the ends 172 of the legs 164 and 166 laterally inward toward each other when the retainer 16 is inserted into the housing 28. When the tips 156 clear one edge of the grooves 140' and 142', the resilient nature of the legs 164 and 166 snaps the ends 172 and the tips 156 laterally outward to create an "avalanche effect" which provides a distinct tactile feedback to the user indicating that the retainer has lockingly engaged the housing 28 in either the partially inserted position, shown in FIG. 4, or the fully inserted position shown in FIG. 5.

It should be noted that further insertion force on the retainer 16 moving the retainer 16 from the partially inserted position in FIG. 4 to the fully inserted position shown in FIG. 5 again causes the ends 172 of the legs 164 and 166 to be urged laterally inward when the tips 156 of the legs 164 and 166 slide along the lower portion of the inner surfaces. When the tips 156 clear the outer end of the inner surfaces, the legs 164 and 166 spring laterally outward in a distinct "avalanche effect" manner. The lower ends of the grooves 140' and 142' are angled to enable the tips 156 to slide out of the grooves 140' and 142' toward the fully latched position.

The retainer 16 can be first be installed on the housing 28 in a shipping or storage position depicted in FIG. 4. In this position, the projections 170 on the side legs 164 and 166 of the retainer 16 snap into and engage the longitudinally extending grooves 140' and 142'.

Further insertion of the retainer 16 through the aligned apertures 149 and 151 in the housing 28 causes the ends 172 of the legs 164 and 166 to pass along the lower portion of the inner surfaces of the flat surfaces 140 and 142 until the tips 156 clear the ends of the surfaces and then snap outward exteriorly of the outer surface of the first end 124 of the housing 28 as shown in FIG. 5. In this fully inserted position of the endform 12 in the housing 28, an annular locking surface recess 28 on the endform 12 is situated ahead of the arms 182 and 184 of the retainer 16. This position represents the fully latched position in which the endform 12 is fully seated in and lockingly engaged with the connector housing 28. The full insertion of the retainer 16 into the housing 28 also provides visible indication of the fully locked connection of the endform 12 and the housing 28.

It will also be apparent that if the retainer 16 is in the fully latched position shown in FIGS. 1 and 5, prior to insertion of the endform 12 into the housing 28, the radially inward extent of the arms 182 and 184 block full insertion of the endform 12 into the housing 28. If the tip end 20 of the endform 12 is spaced from the fully inserted position in the bore in the housing 28 shown in FIG. 2, the arms 182 and 184 on the retainer 16 will engage on the flange on the endform 12 such that the retainer 16 cannot be transversely moved into the fully latched position. When this occurs, the outer edge of the central leg 162 of the retainer 16 will extend outward from the housing 28 to provide an indication of a non-fully inserted endform 14.

Further details of the construction and operation of the retainer 16 can be had by referring to U.S. Pat. Nos. 5,542,716; 5,782,502; 5,951,063; and 5,782,502, the contents of which are incorporated herein by reference.

It will be understood that the above-description of a retainer configured for releasable engagement with a recess in an endform to releasably latch the endform to the quick connector housing is by way of example only. Other retainer/endform latching configurations, such as the transversely mounted retainer which engages a recess in an endform as described in U.S. Pat. No. 6,637,779 can also be employed as the quick connector of the present invention.

In addition, axially mounted retainers and quick connector housing configurations typically employed with raised SAE flanged or beaded endforms, as shown in U.S. Pat. No. 6,402,204, may also be employed as the quick connector of the present invention.

A top hat 84, shown in FIGS. 2 and 7–9, is in the form of a one-piece member typically of a rigid plastic having an annular sleeve 86 projecting from a flange 82. A through bore 88 extends through the sleeve 86 and the flange 82 for accommodating the end portion of the first conduit 12 and for allowing the tip end 18 of the first conduit 12 to slide therethrough as shown in FIG. 1.

Figure 7:
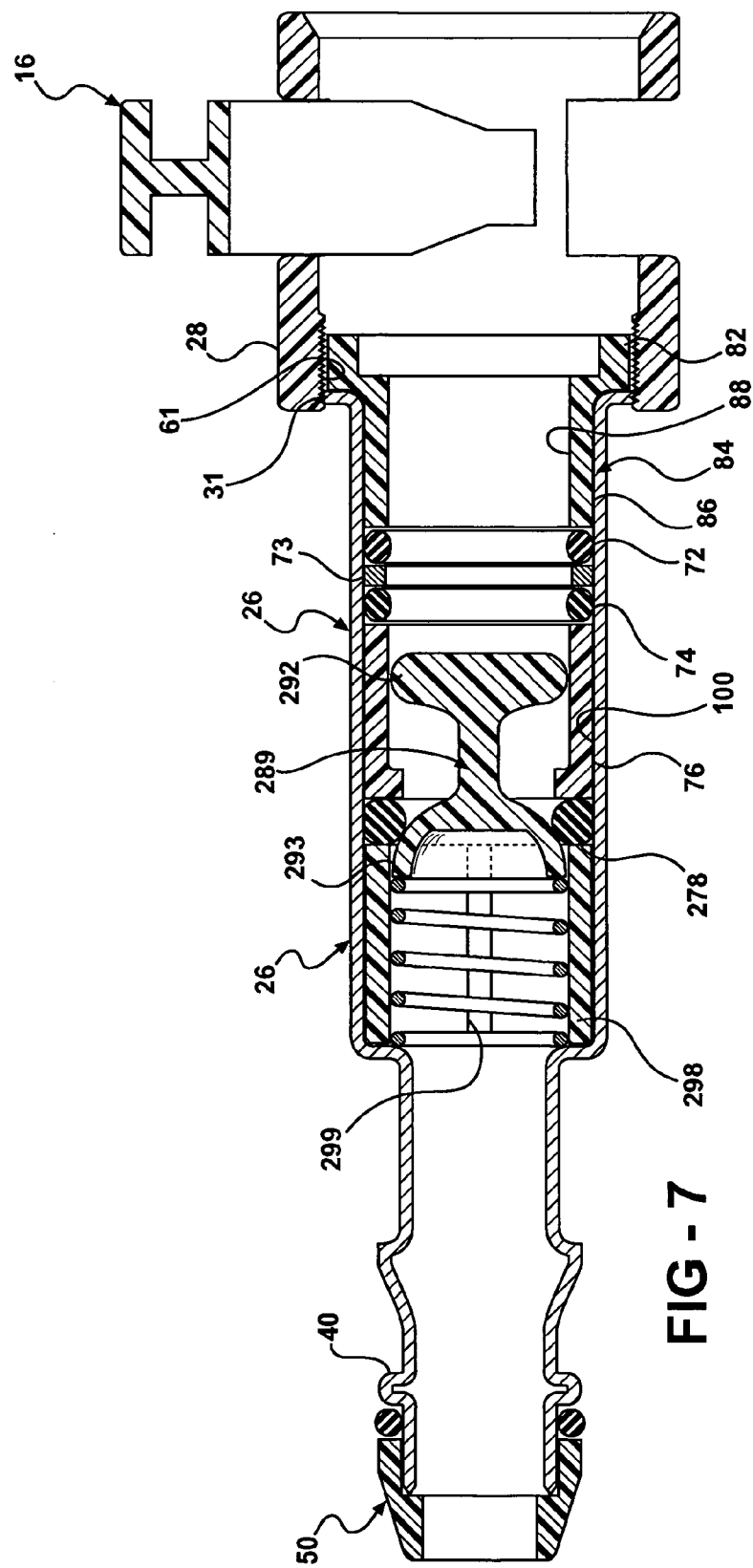
FIG. 7 is a longitudinal cross sectional view through the fluid quick connector shown in FIG. 1, depicting the valve in a flow blocking position prior to insertion of an endform into the quick connector.

Referring briefly to FIG. 7, an end face 72 of the sleeve 86 on the top hat 84 holds a plurality of seal and spacer elements including, by example, one O-ring 73, an annular spacer 74 and another O-ring 75 in position adjacent a sleeve 76 disposed in the bore of the first housing 26. A seal member, such as an o-ring 278, is interposed between an inward extending flange at one end of the sleeve 76 and an adjacent portion of the housing 26.

Figure 8:
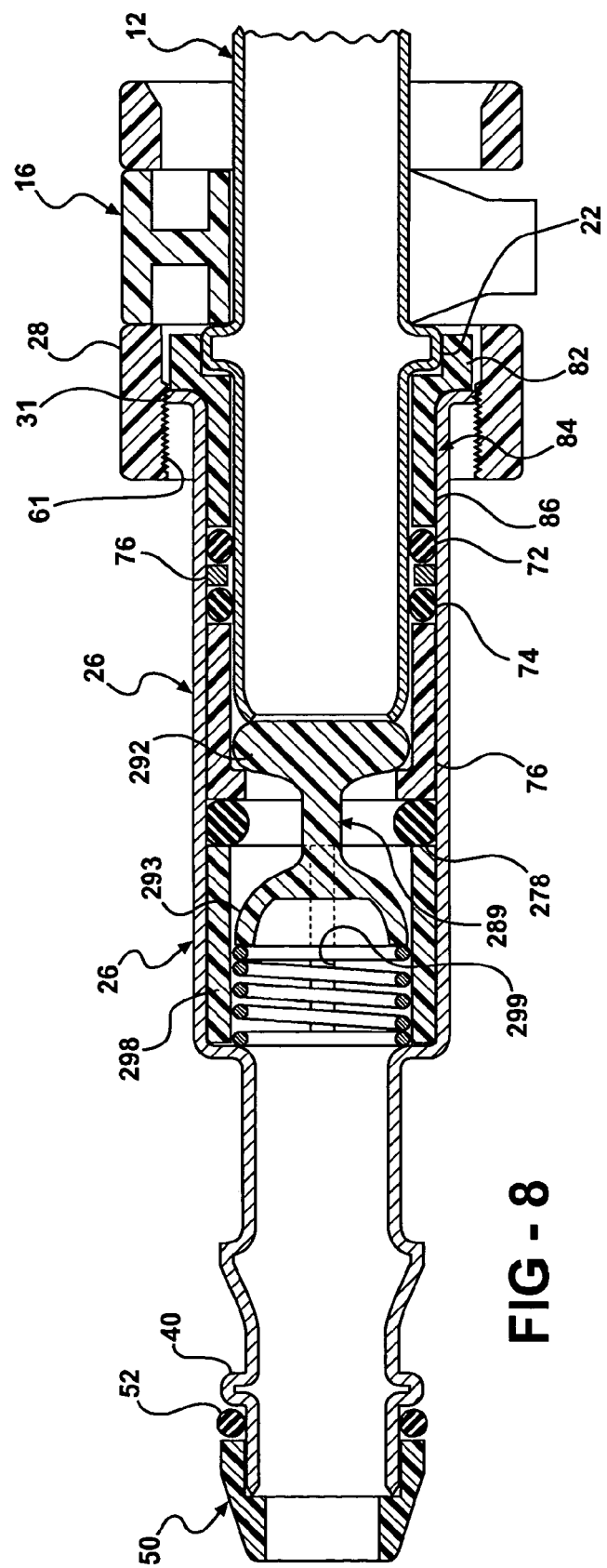
FIG. 8 is a longitudinal cross sectional view through an the assembled fluid quick connector shown in FIG. 1, with the valve disposed in the open, fluid flow enabling position.
Figure 9:
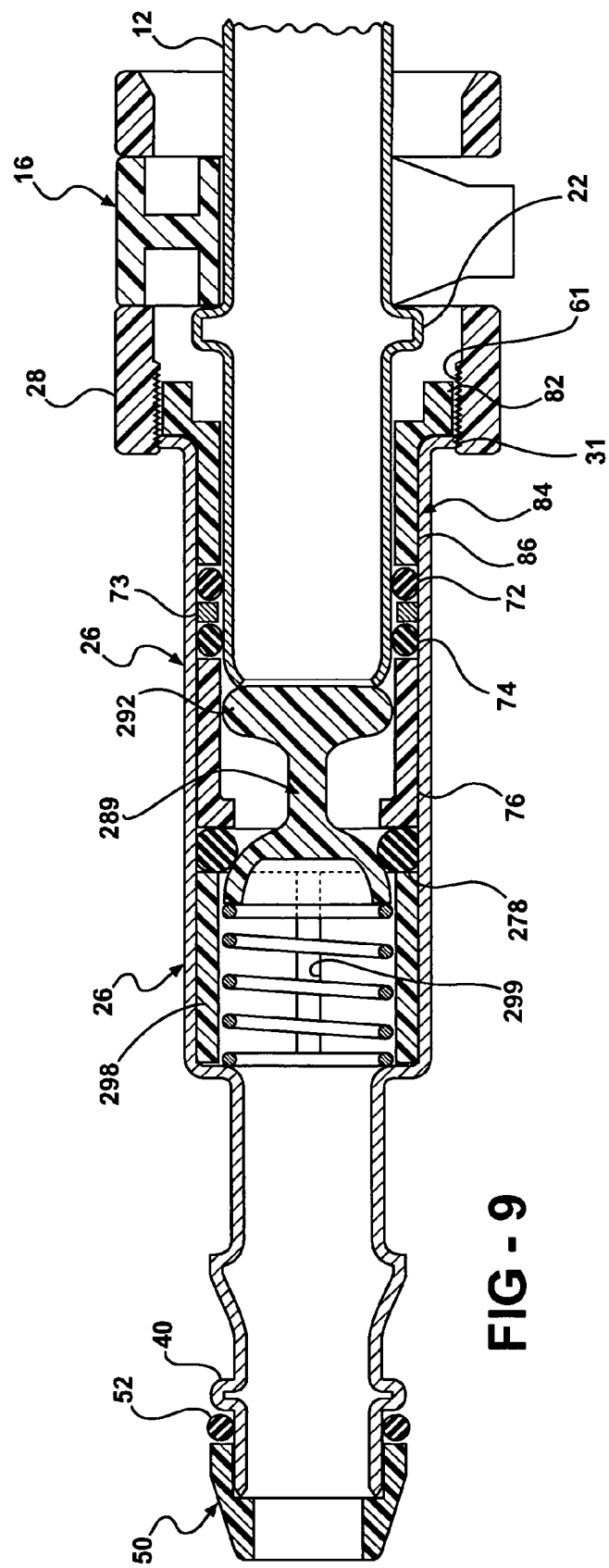
FIG. 9 is longitudinal cross section of the assembled fluid quick connector of FIG. 1, with the valve shown in the closed, fluid flow enabling position by threading movement of the connector housings.

As also shown in FIGS. 8 and 9, the seal elements 73, 74 and 75 sealingly engage the outer surface of the first conduit 12 when the tip end 18 of the first conduit 12 is inserted through the top hat 84 and into the stepped bore in the first housing 26. The bore 88 formed through the sleeve portion 86 of the top hat 84 acts as a bearing surface for the end portion of the first conduit 12. In this position, the flange 82 on the top hat 84 is disposed adjacent to the annular flange 30 on the first housing 26.

As best viewed in FIGS. 2, 6, 7, 8, and 9, a check or shut off valve 289 disposed within the bore 100 in the first housing 26. The valve 289 includes a generally goblet-shaped valve member including a hemispherical seat portion 290, elongated stem portion 291 and a radially extending guide portion 292. The valve 289 is disposed concentrically within the bore, seat portion 290 having a concave recess formed therein. The seat, the stem portions, and the guide portions 290, 291, and 292, respectively, are integrally formed from suitable materials, such as injection molded plastic. The outer circumferential surface of the seat portion 290 defines a curved annular seat 293 which sealingly engages a fixed resilient annular seal 278, such an O-ring, within bore 100 to selectively open or check the flow of fluid through bore 100.

A helical spring normally biases the valve 289 from an open fluid flow position shown in FIG. 8 towards a closed position shown in FIG. 7. Guide portion 292 forms a generally fishtail configuration defining a leftwardly facing abutment surface 294 configured to abut a tip end 20 of the endform 12 to displace valve 289 to its open position. Generally parallel laterally opposed surfaces 295 and 291 of the guide portion 292 provide clearance for fluid flow through the open end of the endform 12. The rounded contour of abutment surface 294 provides a degree of swivel or rocking freedom to effect positive engagement between abutment surface 294 and leading edge or tip 18 of the endform 12 to ensure straight, axial displacement thereof.

Thus configured for high strength, light weight and minimal cross sectional area (flow resistance), the valve 289 is displaceable from the first or closed position illustrated in FIG. 7 wherein the seat 290 contacts the seal 278 to entirely close off fluid flow through the bore in the housing 26, to a second position illustrated in FIG. 8 wherein the valve 289 is displaced to establish open communication through bore. The valve 289 is displaced from the first to the second position in response to full insertion of the tip end 18 of the end form 12 within the bore 100 and the interlocking of the retainer 16 with the endform 12 in the usual manner. Once engaged, the tip end 18 of the endform 12 contacts guide portion to displace the valve 289 to its open position.

As best viewed in FIGS. 2, 7, 8, and 9, a plurality of circumferentially spaced, axially elongated, radially inwardly directed guide ribs 298 are formed on the inner diameter of bore portion and serve to radially guide seat portion 290 of valve member 289 while permitting relatively free axial displacement thereof.

Recesses or slots 299 are formed between the ribs 298 for fluid flow around the seat 290 of the valve 289 when the valve 289 is in the open position shown in FIG. 8. The ribs 288 and slots 299 maybe formed in a cylindrical sleeve shown in FIGS. 7–9 which is mounted in the bore 100 or integrally formed in the inner surface of the housing 26.

In application, when the endform 12 and the retainer 16, are fully engaged, as illustrated in FIG. 8, the valve 289 is retained in the open position to provide a free and relatively unrestricted flow of fluid through the bores in the housings 26 and 28 to the endform 12.

According to another aspect of the present invention, an adjustable interface denoted by reference number 210 is disposed between the top hat 86 and one end portion of the second housing 28. The adjustable interface 210 may be, by example only, formed by external threads 31 on the flange 30 of the housing 26 and internal threads 61 on one end of the second housing 28. The threads 31 and 61 are complimentary to each other and provided in a suitable length to enable adjustment of the valve 289 between the fully opened, flow enabling position in FIG. 8 and the completely closed, fluid flow blocking position shown in FIG. 9.

It should be noted that in all positions, the tip end 18 of the end form 12 is fully retained within the mating housings 26, 28 by the retainer 16 in sealed engagement with the seal members 72, 73 and 74 in the first housing 26.

In the fully opened position of the valve 288, the second housing 28 is threaded as far axially forward relative to the first housing 26 as possible as shown in FIG. 8. This enables the tip end 16 of the end form 12 to be inserted further into the bore 100 in the first housing 26 thereby axially moving the valve 289 such that the lower portion of the valve 289 is spaced from the seal 278 thereby providing a large cross sectional opening between the recesses in the sleeve 76 and the remainder of the bore 100 of the first housing 26 for maximum fluid flow through the quick connector 10.

However, when the second housing 28 is threaded as far as possible to the position shown in FIG. 9, the biasing spring acting on the valve 289 forces the tip end 18 of the end form 12 axially away from the end of the first housing 26 into the position shown in FIG. 9. This causes the lower portion of the valve 289 to seat against the seal 278 thereby closing the bore 100 in the first housing 26 to fluid flow.

What is claimed is:

1. A fluid quick connector comprising:
   an end form having a bore extending from a tip end;
   a first housing having a through bore;
   a second housing have a through bore, the second housing coupled to the first housing;
   a shut off valve disposed in the bore in the first housing, the valve having a seal end and a guide portion, the valve axially moveable from a fluid flow blocking position to a fluid flow position in response to contact of the tip end of the end form with the guide portion of the value and full insertion of the end form in the bores in the first and second housing;
   at least one seal member carried in the first housing and engaged by the valve in the fluid blocking position;
   a separate retainer carried on the second housing for releasably locking the end form in the first and second housings
   a threaded axial interface carried on adjoining portions on the first housing and the second housing threadingly varying the extent of the insertion of the tip end of the end form into the bore in the first housing and the axial position of the valve with respect to the at least one seal member engaged with the end form after the end form is latched in the first and second housings by the retainer to selectively vary the cross-sectional opening between the valve and the at least one seal member to regulate the fluid flow through the first and second housings.

2. The fluid quick connect of claim 1 further comprising:
   biasing means acting on the valve for normally biasing the seal end of the valve into sealing engagement with a seal member in the bore in the first housing for blocking fluid flow through the first housing.

3. The fluid quick connector of claim 1 for wherein the axial interface comprises:
   threads formed on adjoining portions of the first housing and the second housing to provide axial translation of the end form relative to the first housing by relative threading of the first and second housings relative to each other.

4. The fluid quick connector of claim 3 further comprising:
   a radially outward extending surface carried on the first housing, the threads carried on the surface.

5. The fluid quick connector of claim 3 further comprising:
   biasing means acting on the valve for normally biasing the seal end of the valve into sealing engagement with a seal member in the bore in the first housing for blocking fluid flow through the first housing.

6. The fluid quick connector of claim 1 further comprising:
   a transverse bore formed in the second housing;
   the retainer movably mounted in the transverse bore for movement between an end form unlatched position and an end form latched position.

7. A fluid quick connector comprising:
   an end form having a bore extending from a tip end;
   a first housing having a through bore;
   a second housing have a through bore the second housing coupled to the first housing;
   a shut off valve disposed in the bore in the first housing, the valve having a seal end and a guide portion, the valve axially moveable from a fluid flow blocking position to a fluid flow position in response to insertion of the tip end of the end form in the bores in the first and second housing into contact with the guide portion of the valve;

a retainer carried on the second housing for releasably locking the end form in the first and second housings;

means for repositioning the valve between the fluid blocking positions and the fluid flow positions after the end form is latched in the first and second housings by the retainer;

biasing means acting on the valve for normally biasing the seal end of the valve into sealing engagement with a seal member in the bore in the first housing for blocking fluid flow through the first housing;

at least one seal member disposed in the first housing;

a top hat disposed in the first housing for retaining the at least one seal member in the first housing; and a recess carried in the top hat for receiving a radially enlarged flange on an end form when the end form is fully inserted into the bore in the first housing.

* * * * *

UNITED STATES PATENT AND TRADEMARK OFFICE
CERTIFICATE OF CORRECTION

PATENT NO. : 7,121,592 B2 Page 1 of 1
APPLICATION NO. : 10/937924
DATED : October 17, 2006
INVENTOR(S) : George Szabo and Gary Klinger It is certified that error appears in the above-identified patent and that said Letters Patent is hereby corrected as shown below:

Title Page, Item (75) Inventors:

Please correct inventor's name as follows:

--George Szabo--

Title Page, Item (12)

Delete "Sazbo et al." replace with -- Szabo et al. --.

Signed and Sealed this

Twenty-seventh Day of March, 2007

JON W. DUDAS
*Director of the United States Patent and Trademark Office*